United States Patent
Muthiah et al.

(10) Patent No.: US 6,218,483 B1
(45) Date of Patent: Apr. 17, 2001

(54) POWDER COATING OF EPOXY RESIN, IMIDAZOLE-EPOXY RESIN CATALYST OR POLYAMINE, POLYAMINE POWDER AND AMINE SCAVENGER

(75) Inventors: Jeno Muthiah, Shamburg, IL (US); Gordon Tullos, Reading; Jaquelyn Schelessman, Temple, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/472,402

(22) Filed: Dec. 27, 1999

Related U.S. Application Data

(63) Continuation-in-part of application No. 09/325,873, filed on Jun. 4, 1999, which is a continuation-in-part of application No. 08/917,043, filed on Aug. 19, 1997, now Pat. No. 6,077,610, which is a division of application No. 08/810,745, filed on Mar. 4, 1997, now Pat. No. 5,714,206, which is a continuation-in-part of application No. 08/729,608, filed on Oct. 11, 1996, now abandoned, which is a continuation-in-part of application No. 08/643,694, filed on May 6, 1996, now abandoned.

(51) Int. Cl.$^7$ .............................. C08L 63/02; C08L 63/04
(52) U.S. Cl. .................. 525/526; 525/113; 525/486; 525/488; 525/528; 525/530; 525/533; 525/934
(58) Field of Search .................... 428/413, 541; 525/486, 488, 526, 528, 530, 533, 934, 113

(56) References Cited

U.S. PATENT DOCUMENTS

| | | | |
|---|---|---|---|
| 3,756,984 | * | 9/1973 | Klaren et al. . |
| 4,757,117 | * | 7/1988 | Moss . |
| 5,221,700 | * | 6/1993 | Gilbert et al. ...................... 523/404 |
| 5,721,052 | * | 2/1998 | Muthiah et al. .................... 525/526 |
| 5,798,399 | * | 8/1998 | Griggs et al. ....................... 525/523 |
| 5,801,218 | * | 9/1998 | McKenzie ........................... 525/523 |

FOREIGN PATENT DOCUMENTS 58-25327  *  2/1983  (JP) .

* cited by examiner

Primary Examiner—Robert E. L. Sellers

(57) ABSTRACT

Heat sensitive substrates, as well as others such as metal or glass, are electrostatically coated with a thermosetting coating powder comprising a melt-mixed, chilled, chipped, and powdered blend of an epoxy resin and a catalyst therefore, and a polyamine as a powdered low temperature curing agent along with a scavenger which will react secondarily with residual polyamine domains that do not contact the base epoxy resin during curing. The coating powder is deposited on the substrate and heated to fuse, flow and cure. The mixture of resin and catalyst does not cure within the extruder but it is made to cure at low temperatures on the desired substrate by the separate addition of the curing agent to the powdered melt-mixed blend.

2 Claims, No Drawings

POWDER COATING OF EPOXY RESIN, IMIDAZOLE-EPOXY RESIN CATALYST OR POLYAMINE, POLYAMINE POWDER AND AMINE SCAVENGER

This is a continuation-in-part of Ser. No. 09/325,873, filed Jun. 4, 1999, which is a continuation-in-part of Ser. No. 08/917,043, filed Aug. 19, 1997, U.S. Pat. No. 6,077,610, which was a divisional of Ser. No. 08/810,745, filed Mar. 4, 1997, a U.S. Pat. No. 5,714,206, which was a C-I-P of Ser. No. 08/729,608, filed Oct. 11, 1996 (abandoned), which was a C-I-P of Ser. No. 08/643,694 filed on May 6, 1996 (abandoned).

BACKGROUND OF THE INVENTION

This invention relates to a two-component powder coating system by which the curing of a coating occurs at a significantly faster rate and/or at a significantly lower temperature and produces an exceptionally smooth surface. This invention also relates to thermally stable powder coating whereby white coatings do not yellow during thermal curing. This invention also relates to the electrostatic coating of metal and, in particular, to the coating of heat sensitive substrates such as wood with a coating powder and the low temperature curing of that coating to achieve a pleasing smoothness. More particularly, it relates to an improvement of the humidity resistance of such a coating.

Traditionally, coating powders have been made by the extrusion of a mixture of resins and curing agents to obtain a homogeneous mixture and then grinding the extrudate and screening the comminuted product to obtain the desired particle sizes and particle size distribution. The powder is then electrostatically sprayed onto a substrate, traditionally a metal substrate, and cured at temperatures much higher than 200° F. The curing of powder coatings on heat sensitive materials such as wood, plastic, and the like has been limited by the fact that the extrusion of a mixture of a resin and a low temperature curing agent, i.e., one that is active at 200° F. or less, would cause the coating powder to gel in the extruder because the extrusion typically generates enough heat to raise the temperature to 200° F. or higher. It has been thought throughout the art that the curing agent must be mixed with the resin by extrusion to obtain a uniform cure and film appearance. It has also been commonly accepted that a low gloss film must be cured at a high temperature, e.g., about 300° F. or higher.

In this invention, a self-curing epoxy resin is first melt-mixed (e.g., extruded) with a small amount of catalyst or with a low level of a low temperature curing agent, then chilled and ground to a obtain a first powder and classified in the usual manner. Additional amounts of the low temperature curing agent in powder form are then blended with the first powder to raise the level of curing agent while avoiding the pre-gelation problem. Surprisingly, the time required to obtain a smooth cured film is lowered significantly. It is surprising, also, that a low gloss film is achieved at cure temperatures much lower than 300° F.

The blending of the first powder with the powdered curing agent to make a two component coating powder is disclosed in U.S. Pat. No. 5,714,206 which issued from an application commonly assigned herewith, and in commonly assigned, co-pending Ser. No. 09/325,873 which was filed on Jun. 4, 1999. Now, it has been found that the humidity resistance of coatings made from such two component powders is improved by inactivating polyamine domains that remain in the powder because of incomplete blending and do not come into contact with the base epoxy resin and which, otherwise, would be carried over into the cured coating.

SUMMARY OF THE INVENTION

It is an object of this invention, therefore, to provide a coating powder for heat sensitive substrates.

It is a related object of this invention to provide a method for coating such substrates without the problems associated with volatile organic solvents.

It is another object of this invention to provide a low temperature process for producing a smooth, low gloss coating on wood and other such substrates.

It is yet another object of this invention to provide a powder coating for heat-sensitive substrates that has an improved resistance to high humidity.

These and other objects of the invention which will become apparent from the following description are achieved by a thermosetting powder coating system in which the thermosetting of a melt-mixed blend of an epoxy resin and (A) a catalyst or (B) an amount of a low temperature curing agent insufficient to cause substantial curing of the resin during melt-mixing is facilitated by the separate addition of (C) a polyamine as a friable low temperature curing agent; said melt-mixed blend and said separately added low temperature curing agent being further blended with (D) a scavenger which will react secondarily with polyamine domains that will not have reacted with the base epoxy resin during curing.

For the purposes of this invention, the term base epoxy resin means the principal self-curing epoxy resin as opposed to epoxy resins functioning as adducting agents for polyamines and imidazoles. Also, for the purposes of this invention, the resin means the base epoxy resin per se plus the crosslinking agent, whether it is in the melt-mix or is added separately, but not the catalyst.

DETAILED DESCRIPTION OF THE INVENTION

A particularly favored embodiment of the system is one in which competing reactions are taking place simultaneously, said reactions being:

(A) a catalyzed self-curing of a portion of an epoxy resin present in a powdered, melt-mixed blend of the resin and a catalyst, and (B) a crosslinking reaction between another portion of the powdered, melt-mixed resin and the polyamine as a friable low temperature curing agent.

Epoxy resins which are useful as the principal self-curing resins in the practice of this invention are produced by the reaction of epichlorohydrin and a bisphenol or a novolac resin. Bisphenol A/epoxy resins are sold under the trademarks ARALDITE GT-7004, 7013, 7072, 7074, 3032, 6062, and EPON 1007F, 1009F, and 1004. The epoxy novolac resins are exemplified by epoxy phenol novolac (EPN) and epoxy cresol novolac (ECN). ARALDITE GT-7220 and GT 6259 are trademarks for an EPN and an ECN resin, respectively.

The epoxy resin is self-curing, i.e., it reacts via homopolymerization during curing of the powder coating. Generally, a catalyst is required to cause the reaction to progress at a commercially acceptable rate. A preferred catalyst for this invention is an epoxy adduct of an imidazole having the general formula:

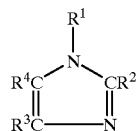

wherein $R^1$, $R^2$, $R^3$, and $R^4$ are independently hydrogen or any substituent which is not reactive with the base epoxy resin. Examples of suitable imidazoles include imidazole, 2-methyl imidazole, and 2-phenyl imidazole. Suitable adducts of such imidazoles with a bisphenol A epoxy resin are available commercially from Shell Chemical Company under its trademark EPON, e.g., EPON P-101, and also from Ciba-Geigy Corporation under its designation HT-3261. For the purposes of this invention, the term imidazole is used herein to mean both the substituted and unsubstituted imidazoles. Although applicants are not bound to any theory, it is believed that an imidazole adducts to epoxy resins by an opening of the epoxy ring that results in the epoxy oxygen bonding to the C=N bond of the imidazole ring. The adducted imidazole acts as a catalyst, moving from one epoxy group to another as it facilitates epoxy ring opening and cure reactions. The imidazoles are, in themselves, the operative catalysts but they tend to be insoluble in epoxy resins. Thus, the purpose for adducting them to an epoxy resin is to make them compatible with the epoxy system. As a catalyst, the imidazole adduct is used in the systems, methods, and powders of this invention at a level of from about 0.1 to about 8 parts per hundred parts of the extruded resin (abbreviated as phr), preferably at about 2 phr. For enhanced color stability, the 2-phenyl imidazole, which is available from the SKW Chemical Co., may be used as the catalyst for curing the epoxy resin with the low temperature curing agent.

Polyamines in general are the active curing agents in this invention. They are exemplified by ethylene diamine, isophorone diamine, cyclohexylenediamine, and a fluorinated diamine such as 4,4'-hexafluoroisopropylidene bis-aniline. They must be converted, however, from their usual liquid state into a friable solid that may be pulverized in order to serve in this invention. A friable solid low temperature curing agent may be selected from a blocked polyamine such as an adduct of an epoxy resin having an equivalent weight of from about 400 to about 800 and an aliphatic polyamine having a primary, secondary, and/or tertiary amino group is preferable. The epoxy resin portion of the adduct is aromatic or aliphatic, as exemplified by the bisphenol-based resins mentioned above and the aliphatic analogs thereof, respectively. The cyclohexanol analog of the bisphenol A-based resin is available under the trademark KUKDO 4100. Higher molecular weight polyamines are preferred when epoxy resins having a low equivalent weight (e.g., GT 7071 from Ciba) are employed. Suitable curing agents derived from polyamines having a primary amino group are available from Ciba Ceigy as its HT 835 hardener and from Air Products & Chemicals under the trademark ANCAMINE 2337 XS. An epoxy adduct of an aliphatic polyamine having a secondary amino group available under the trademark ANCAMINE 2014 AS is preferred for white and light colored coatings.

The amount of low temperature curing agent that may be added separately as component (B) to the pulverized extrudate of resin and catalyst is from about 2 to about 40 phr and the preferred amount is from about 30 to about 35 phr. The ratio of the low temperature curing agent to the catalyst in the extrudate is from about 1:3 to about 400:1 but preferably from about 2:1 to about 15:1.

The inactivation of polyamine domains in the powder coating which arise from residual, segregated polyamines in a friable curing agent of an imperfectly blended coating powder is a critical aspect of this invention. Said inactivation, as was said above, is achieved by the addition to the coating powder of from about 2 to about 15 parts per hundred parts of the resin (phr) of a scavenger which will react secondarily with polyamine domains that will not have reacted with the epoxy resin during curing. Such a scavenger is, therefore, less reactive with a polyamine than are the base epoxy resins disclosed above. Glycidyl methacrylate is a prime example of such a scavenger; other examples include acrylate esters, anhydrides of polycarboxylic acids, blocked isocyanates, and aliphatic epoxies.

The imidazoles, as adducts or non-adducts, may also be used at higher levels as an additional, separately added curing agent to the extruded mixture of the resin and catalyst. When this is done, the amount of imidazole adduct is controlled so that the total amount is no more than about 12 phr.

The coating powder may also contain a flow control agent in the range of from about 0.5 to about 2.0 phr. Examples of the flow control agents include the MODAFLOW poly(alkylacrylate) products and others such as the SURFYNOL acetylenic diols (e.g., P200) which contain hydroxyl, carboxyl or other functional groups. The functionalized flow additives also aid intercoat adhesion in the event that touch-up or repair of the powder coating is necessary. The flow additives may be used singly or in combination. Anti-oxidants may also be used at a concentration of from about 0.5 to about 2.0 phr to prevent the discoloration of the coatings even at the relatively low curing temperatures suitable for the purposes of this invention. Examples of the anti-oxidants that are useful in this invention include sodium hypophosphite, tris-(2,4-di-t-butyl phenyl) phosphite (sold under the trademark IRGAFOS 168), and calcium bis([monoethyl(3,5-di-t-butyl-4-hydroxybenzyl)phosphonate] (sold under the trademark IRGANOX 1425). Mixtures of anti-oxidants may be used. The sodium hypophosphite also acts a buffer against the action of trace amounts of chlorine released by epichhlorohydrin residues in the epoxy resins.

Pigments, optical brighteners, matting agents such as various styrene/maleic anhydride copolymers, fillers such as calcium carbonate and bentonite clays, texturizing agents such as particulate rubber, and other conventional additives may also be present. A particularly desirable textured finish may be obtained by the addition of from about 14 to about 20 phr of the rubber to the coating composition along with calcium carbonate at a rubber to carbonate ratio of from about 0.7:1 to about 1.5:1 by weight. Titanium oxide, in an amount of from about 5 to about 50 phr or more, is an example of a pigment that may be used. An optical brightener, exemplified by 2,2'-(2,5-thiophenediyl)bis[5-t-butylbenzoxazole, sold under the trademark UVITEX OB, may be present at from about 0.1 to about 0.5 phr.

Extrusion is but one form of melt-mixing known to the powder coating art for the thorough mixing of components that is necessary in the manufacture of the powder. It is, however, a convenient and efficient form of melt-mixing which is advantageous in this invention. An alternative method for mixing the components of the coating powder of this invention is to extrude (A) a mixture of an epoxy resin and a catalyst, and (B) a friable low temperature curing agent separately in sheet form, press the hot sheets together, cool and grind the composite sheet, and classify the powder to obtain a particle distribution of from about 10 to about 100 µm. In like manner, the A and B components may be co-extruded and the merging sheets pressed together at the outlet of the co-extruder and then cooled and ground. In each case, the relative thicknesses of A and B sheets having the same dimensions otherwise are linearly proportional to the relative amounts of the resin/catalyst mixture and the curing agent.

The curing system of this invention may be used in coating glass, ceramics, and graphite-filled composites as well as metallic substrates such as steel and aluminum but its particular utility in the coating of heat sensitive substrates such as plastics, paper, cardboard and woods makes it highly appealing as a commercially viable alternative to the liquid coatings that have been almost universally used in the past. For the purposes of this invention, wood is defined as any lignocellulosic material whether it comes from trees or other plants and whether it be in its natural forms, shaped in a saw mill, separated into sheets and made into plywood, or chipped and made into particleboard, or its fibers have been separated, felted, and compressed. It is exemplified by lumber, panels, molding, siding, oriented strand board, hardboard, medium density fiberboard (MDF), and the like. Fiberboard having a pattern such as a simulated wood grain printed on its surface, rather than on a paper laminated to that surface, and a powder coating of this invention over said pattern has the appearance of natural wood. MDF is a particularly valuable substrate for said purpose. Substrates having a moisture content of from 3 to 10% by weight are suitable for the purposes of this invention. The substrate may be treated to enhance its electrical conductivity. Thus, a porous substrate such as particleboard, pre-coated with a conductive liquid coating composition and cured, may also serve as a substrate for the coating powder of this invention. For example, a smooth 2–3 mil thick powder coating is achieved on a 0.5 to 1 mil thick UV- or thermally cured pre-coat. The powder coating of plastic parts for the interior and exterior of automobiles further exemplifies the utility of this invention.

Due to the highly reactive nature of the two-component coating powder of this invention, storage at or below 70° F. is desirable to maintain consistent coating characteristics over extended periods of time. Consistent coating characteristics are maintained over a 3 month period when the powder is stored at 50° F.

The coating powder of this invention may be applied by any of the conventional powder coating methods such as immersion of an article in a fluidized bed or in a corona discharge cloud but the application of the powder by triboelectric guns is preferred in particular situations such as when a wooden substrate is profiled. The grooves and ridges present a particular problem for electrostatic coating processes because of the Faraday effect. Because the electrical field generated by friction as the powder flows along the TEFLON plastic surfaces inside the gun is relatively small in comparison with the field in a corona-discharge cloud, the powder particles may be deposited more efficiently into Faraday cage areas with triboelectric guns. Wooden cabinet doors are examples of a profiled wooden substrate as are the doorskins represented by the drawings in U.S. Pat. No. 5,489,460, which is incorporated herein by reference to further illustrate the type of wooden panels that are particularly susceptible to powder coating by the method of this invention. The grooves and sharp edges of such panels are covered very well on a flat line coating apparatus with nozzles arrayed to direct a portion of the powder against them.

Such panels as well as flat-surfaced panels such as those used to make ping-pong tables are particularly well coated by triboelectric guns on a flat line conveyor having electrically conductive bands around the circumference of the conveyor belt. Apparatus for such coating is disclosed in a series of patents assigned to the Nordson Corporation. These are U.S. Pat. Nos. 4,498,913; 4,590,884; 4,723,505; 4,871,380; 4,910,047; and 5,018,909; all of which are incorporated herein by reference. A suitable flat line powder coating apparatus comprises such a conveyor extending through a powder coating booth, wherein a wooden article supported and moved by the conveyor belt is coated triboelectrically by a plurality of guns situated adjacent one another and in one or more tiers. The powder is forced into the guns under about 40 psi pressure and air at about 20 psi is passed into the powder conduits just before the powder passes into the nozzles. The article bearing the powder is then conveyed through a curing oven having several heating zones, some of which are heated by IR lamps, others by heat convection, and still others by a combination of those two. The coating and curing line speeds may be the same or different depending on the the length of the curing oven. The line speed through the powder application booth may be from about 5 to about 150 feet per minute but it is preferably from about 20 to about 100 feet per minute. The line speed through the curing oven, on the other hand, may be from about 5 to about 20 feet per minute, depending on the oven temperature and the particular coating powder used. The curing temperature may range from about 1800 up to but not including the decomposition temperature of the powder. It is preferred to maintain the cure temperature within the range of from about 1900 to about 290° F. and still more preferred to keep the cure temperature at from about 250 to about 290° F. When a crystalline epoxy resin is used, a cure temperature of about 180° F. is particularly suitable. It is preferred that the coating and curing line speeds be adjusted to the oven length so that they are balanced.

Preheating of the panel before the coating step is preferred in some instances, e.g., to help the powder reach its flow temperature in the first zone of the oven and, also, minimize outgassing during cure. The oven may have several heating zones of the IR and convection types and also a combination of the two. The TRIAB Speedoven sold by Thermal Innovations Corporation is suitable for the purposes of this invention. A wooden panel bearing a coating powder of this invention may be cured in a gas-fired IR oven available from Thermal Innovations Corporation by pre-heating the panel in the oven at an emitter temperature of about 1800° F. for from about 4 to about 10 seconds and post-heating at the same emitter temperature for from about 6 to about 10 seconds. When a medium density fiberboard (at about 40° F.), was pre-heated and post-heated at 1800° F. for about 6 seconds and 6.5 seconds, respectively, the surface of the panel next to the IR emitter was about 310° F. after the pre-heating and the post- heating, alike. The surface opposite the IR emitter was about 50° F. as it left the oven. Such relatively cool panels may be stacked atop one another as they come out of the oven. A higher emitter temperature may be used for proportionally shorter times.

The film thickness of the cured coating is at least about 1 mil and it may be as much as about 8 mils or even higher if there is a practical need for such. Film thicknesses of from about 4 to about 6 mils are achieved regularly by the method of this invention, even at coating line speeds of about 100 feet per minute.

The invention is more specifically described in the following working examples wherein the quantity of each ingredient is given in parts by weight unless otherwise stated.

EXAMPLE 1

Component A of a coating powder was made by selecting the kind and quantity of ingredients as given in Table I, blending them, and passing the mixture through an extruder at 210° F. and a screw speed of 400 rpm. The extrudate was cooled, chipped, and ground in a Brinkman grinder having a 12 pin rotor at high speed and passed through a 140 mesh screen. Component B was made in like manner from the ingredients and quantities listed in the Table. Seventy (70) parts of Component A and thirty (30) parts of Component B were then blended with 0.2% by weight of aluminum oxide to give a coating powder of this invention containing 4.5 phr of a secondary epoxy resin.

TABLE I

|  | COMPONENTS | |
| --- | --- | --- |
|  | A | B |
| Epoxy Resin GT-7072 | 100 | — |
| Imidazole Adduct 2-P1 | 3 | — |
| Acrylate Flow Aid | 1 | — |
| Acrylate gloss modifier* | 3 | — |
| Pigments | 2.63 | — |
| TiO$_2$ R-93 | 5 | — |
| Amine Adduct HT-835 | — | 85 |
| GMA resin** | — | 15 |

*S.C. Johnson SCX-848
**Glycidyl methacrylate resin (Andersen)

Four panels of medium density fiberboard (MDF) measuring ⅝"×6"×6" were coated according to Procedure 1 or 2 as indicated in Table II with the powder of Example 1 with a NORDSON VERSA SPRAY II gun and the coating was cured accordingly to build a 4 to 6 mil thick film on each panel. In Procedure 1, the panels were preheated in an oven at 350° F. for 10 minutes, coated promptly, and placed into a curing oven at 350° F. for 5 minutes. In Procedure 2, the panels were preheated in an oven at 350° F. for 10 minutes but coated at a board surface temperature of 200–210° F., and held for two minutes before being placed into a curing oven at 350° F. for 5 minutes. The hot plate melt flow (HPMF) and the gel time of the powder at 300° F. was 53 mm and 24 seconds, respectively.

TABLE II

| Procedure | Voltage | Gloss 60° | MEK | Boiling Water Test* | Hoffman Scratch | Hoffman Mar |
| --- | --- | --- | --- | --- | --- | --- |
| 1 | 60 KV | 9 | 4+ | v. slight | <100 g | <100 g |
| 2 | 60 KV | 9 | 4 | slight | <100 g | <100 g |
| 1 | 100 KV | 14 | 4+ | v. light | pass 100 g | <100 g |
| 2 | 100 KV | 14 | 4+ | slight | pass 100 g | <100 g |

*Humidity resistance tested according to NEMA LD 3.5-1995

The subject matter claimed is:

1. A coating powder comprising a blend of a powdered extrudate of a mixture of a base epoxy resin selected from the group consisting of a bisphenol epoxy resin and an epoxy novolac resin and (A) a catalyst which consists of an epoxy adduct of an imidazole having the general formula:

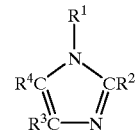

wherein R1, R2, R3 and R4 are independently hydrogen or any substituent which is not reactive with the base epoxy resin, or (B) an amount of a polyamine selected from the group consisting of ethylene diamine, isophorone diamine, cyclohexylenediamine and a fluorinated diamine as a low temperature curing agent insufficient to cause substantial curing of the resin during the extrusion, and (C) an amount of the same or different polyamine as a friable powder sufficient to complete the cure; and (D) a scavenger selected from the group consisting of glycidyl methacrylate, acrylate esters, anhydrides of polycarboxylic acids, blocked isocyanates and aliphatic epoxies which will react secondarily with residual polyamine domains that will not have contacted the base epoxy resin during curing.

2. The coating powder of claim 1 wherein the amount of scavenger (D) is from about 2 to about 15 parts per hundred parts 30 of the base epoxy resin plus crosslinking agent in the blend.

* * * * *

UNITED STATES PATENT AND TRADEMARK OFFICE
CERTIFICATE OF CORRECTION

PATENT NO.      : 6,218,483 B1
DATED           : April 17, 2001
INVENTOR(S)     : Jeno Muthiah, Gordon Tullos and Jaquelyn Schelessman It is certified that error appears in the above-identified patent and that said Letters Patent is hereby corrected as shown below:

Column 8,
Line 41, the phrase "parts 30" should read -- parts --.

Signed and Sealed this

Third Day of September, 2002

Attest:

Attesting Officer

JAMES E. ROGAN
Director of the United States Patent and Trademark Office